(12) United States Patent
Peterson

(10) Patent No.: US 11,199,271 B2
(45) Date of Patent: Dec. 14, 2021

(54) COMPENSATION OF JET FORCES IN A VALVE WITH AN AXIAL OUTLET

(71) Applicant: FLEX LTD., Singapore (SG)

(72) Inventor: Matthew Peterson, Ada, MI (US)

(73) Assignee: FLEX LTD., Singapore (SG)

( * ) Notice: Subject to any disclaimer, the term of this patent is extended or adjusted under 35 U.S.C. 154(b) by 0 days.

(21) Appl. No.: 16/422,093

(22) Filed: May 24, 2019

(65) Prior Publication Data

US 2020/0116266 A1 Apr. 16, 2020

Related U.S. Application Data

(60) Provisional application No. 62/745,137, filed on Oct. 12, 2018.

(51) Int. Cl.
*F16K 11/07* (2006.01)
*F16K 31/06* (2006.01)

(52) U.S. Cl.
CPC ...... *F16K 11/0708* (2013.01); *F16K 31/0613* (2013.01); *F16K 31/0648* (2013.01); *F16K 31/0658* (2013.01); *Y10T 137/86734* (2015.04); *Y10T 137/86759* (2015.04); *Y10T 137/86767* (2015.04); *Y10T 137/86775* (2015.04); *Y10T 137/86807* (2015.04)

(58) Field of Classification Search
CPC ............. F16K 11/0708; F16K 27/029; F16K 31/0648; F16K 31/0658; F16K 31/0613; F16K 31/0693; F16K 31/0655; F16K 47/04; F16K 47/08; Y10T 137/86759; Y10T 137/86734; Y10T 137/86767; Y10T 137/86807; Y10T 137/86755

USPC ............ 251/118–127, 129.07, 129.15
See application file for complete search history.

(56) References Cited

U.S. PATENT DOCUMENTS

| | | | | |
|---|---|---|---|---|
| 4,471,811 A * | 9/1984 | Kawabata | ............... | B62D 6/02 137/625.38 |
| 4,531,545 A * | 7/1985 | Muchow | ............... | E21B 21/106 137/625.39 |
| 4,643,227 A * | 2/1987 | Suzuki | ............... | B62D 6/00 137/625.38 |
| 6,415,820 B1 * | 7/2002 | Glut, Jr. | ............... | B62D 5/062 137/625.65 |
| 8,328,157 B2 * | 12/2012 | Schulz | ............... | B60T 8/363 251/129.15 |
| 8,607,823 B2 * | 12/2013 | Fischer | ............... | F16K 11/0716 137/625.68 |
| 9,494,248 B2 * | 11/2016 | Stucchi | ............... | F16K 31/004 |

(Continued)

*Primary Examiner* — Matthew W Jellett
(74) *Attorney, Agent, or Firm* — Volpe Koenig

(57) ABSTRACT

A solenoid-operated valve assembly that reduces the jet flow of fluid or gas in an axially exiting valve. The valve assembly comprises a spool valve, a valve member housing, and a flow path. The spool valve comprises a fluid communication channel, a tail, and an inlet seat. The valve member housing comprises at least one inlet, at least one nozzle flow director, and at least one outlet. The flow path begins at the at least one inlet and exits at the at least one outlet. The at least one nozzle flow director is within the flow path. The spool valve moves axially within the valve member housing between a closed position and an open position. The inlet seat closes the at least one flow path at the inlet when the spool valve is in the closed position. A method of operation of the solenoid-operated valve assembly is also provided.

17 Claims, 2 Drawing Sheets

(56) References Cited

U.S. PATENT DOCUMENTS

| | | | |
|---|---|---|---|
| 10,428,743 B2* | 10/2019 | Marocchini | F16K 31/0668 |
| 2007/0029413 A1* | 2/2007 | Nakajima | F02M 21/0266 |
| | | | 239/585.5 |

* cited by examiner

COMPENSATION OF JET FORCES IN A VALVE WITH AN AXIAL OUTLET

CROSS REFERENCE TO RELATED APPLICATION

This application claims the benefit of U.S. provisional application 62/745,137 filed on Oct. 12, 2018 which is incorporated by reference as if fully set forth.

FIELD OF INVENTION

This application is generally related to a solenoid-operated valve and more particularly to a valve that significantly reduces the jet force to a level commensurate with the flow rate of the fluid or gas.

BACKGROUND

Solenoid-operated valves are used in a variety of applications, generally to control the flow of fluid or gas, and can be configured to be in a normally-closed or normally-open position when the solenoid is de-energized and in the opposite position when the solenoid is energized.

In spool-type solenoid valves, the spool valves are pressure-balanced and are held in a position by a spring when de-energized. When the solenoid coil is energized, the magnetic force overcomes the spring and shifts the spool valve. When the spool valve is shifted, fluid or gas is free to enter an opening through the inlet and escape out through the outlet. In a typical spool valve, the inlet metering edge or seat moves axially to open and close an opening on a valve body. As the fluid or gas flows through the valve body, the fluid or gas creates a flow or jet force. This jet force acts at an angle relative to the movement of the spool valve and can prevent proper operation. Thus a reaction force is needed to keep the spool valve in equilibrium. Space constraints or other significant reasons can require the fluid or gas path to be axially vented through the outlet.

Accordingly, the need exists for a solenoid-operated valve with axially vented fluid or gas that reduces the jet force on the spool valve.

SUMMARY

A solenoid-operated valve assembly that reduces the jet flow of fluid or gas in an axially exiting valve is provided. The valve assembly comprises a spool valve including a fluid communication channel, a valve member housing including at least one inlet, at least one outlet and at least one nozzle flow director, and a flow path beginning at the at least one inlet and exiting at the at least one outlet. The at least one nozzle flow director is within the flow path. The spool valve moves axially within the valve member housing between a closed position and an open position. A method of operation of the solenoid-operated valve assembly is also provided.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1:
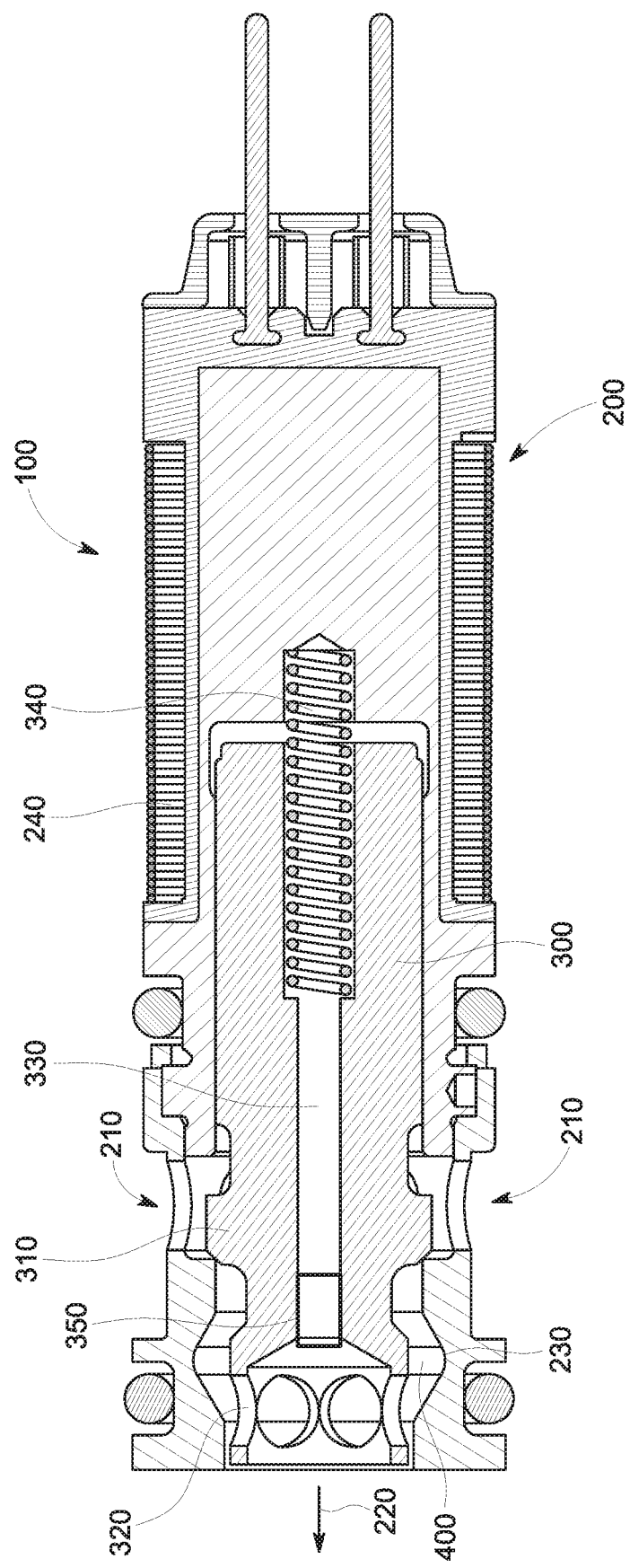
FIG. 1 is a section view of a solenoid-operated valve assembly in a closed position.

For purposes of this detailed description, words such as "front," "back," "top," "bottom," "left," and "right" designate directions in the drawings, and are used for convenience in referring to the designated parts or areas. The use of the terminology "at least one of" followed by a list of elements, such as "A, B, or C," means A, B, or C individually or various combinations thereof.

Referring to FIG. 1, a solenoid-operated valve 100 is provided. The solenoid-operated valve assembly 100 includes a valve member housing 200, a spool valve 300, and a flow path 400.

Moreover, the valve member housing 200 includes at least one inlet 210 and at least one outlet 220. Although the solenoid-operated valve assembly 100 shown in FIG. 1 shows two (2) inlets 210 and one (1) outlet 220, additional inlets 210 and outlets 220 may be provided. As shown in FIG. 1, the valve member housing 200 also includes at least one nozzle flow director 230. Although the solenoid-operated valve assembly 100 shown in FIG. 1 shows one radial nozzle flow director 230, additional nozzle flow directors 230 may be provided. A portion of the valve member housing 200 may also be encompassed by a solenoid coil 240, as shown in FIG. 1. The solenoid coil 240 may receive power. When the solenoid coil 240 is energized, the solenoid coil 240 may generate a magnetic field within the valve assembly 100.

As shown in FIG. 1, disposed within the valve member housing 200 is a spool valve 300. The spool valve 300 moves axially within the valve member housing 200. Moreover, the spool valve 300 moves axially within the valve member housing 200 between an open position and a closed position. The spool valve 300 also includes an inlet seat 310. The spool valve 300 may be in the closed position when the solenoid coil 240 is de-energized and the open position when the solenoid coil 240 is energized. Alternatively, the spool valve 300 may be in the open position when the solenoid coil 240 is de-energized and the closed position when the solenoid coil 240 is energized. In the closed position, as shown in FIG. 1, the inlet seat 310 rests on the inside edge of the inlet 210 and the spool valve 300 is pressure balanced. The spool valve 300 also includes a tail 320. In a preferred embodiment, the spool valve 300 also includes a fluid communication channel 330 and a spring 340. When the solenoid coils 240 are energized and create a magnetic field, the magnetic force overcomes the spring 340 and shifts the spool valve 300 to the open position. Alternatively, the spool valve 300 may shift to the closed position when the solenoid coils 240 are energized. The spool valve 300 may also include a pressure tube 350 within the fluid communication channel 330, as shown in FIG. 1. Moreover, the spool valve 300 may include a hydraulic portion and a magnetic portion that is one part or component.

The valve assembly 100 also includes a flow path 400. The flow path 400 runs from the at least one inlet 210 to the at least one outlet 220. The flow path 400 is sealed off at the at least one inlet 210 by the inlet seat 310 when the spool valve 300 is in the closed position. The flow path 400 is open from the at least one inlet 210 to the at least one outlet 220 when the spool valve 300 is in the open position. Moreover, the at least one nozzle flow director 230 is located within the flow path 400.

Figure 2:
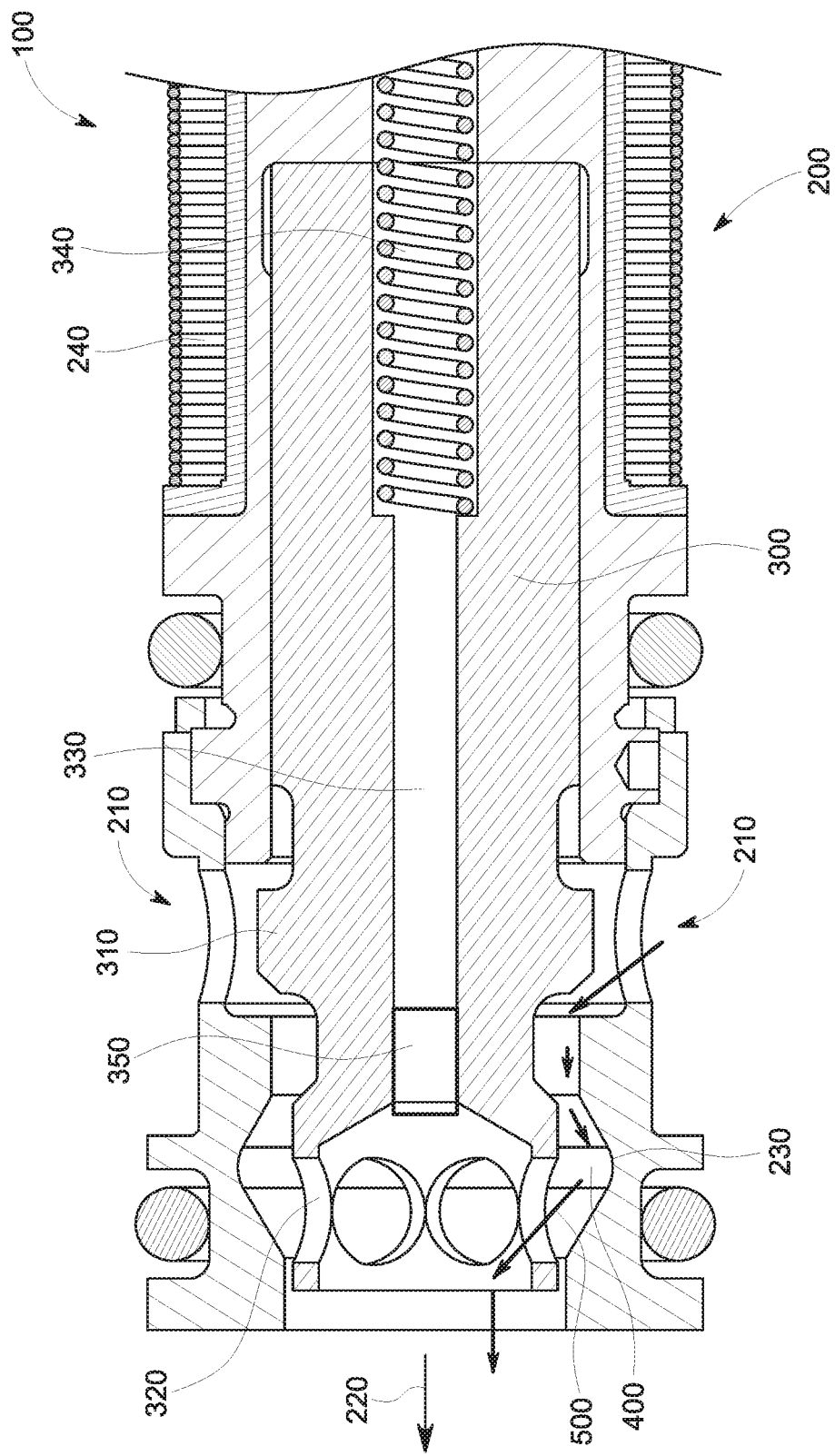
FIG. 2 is a partial section view of the solenoid-operated valve assembly shown in FIG. 1 in an open position.

FIG. 2 illustrates a valve assembly 100 when the spool valve 300 is in the open position. When the spool 300 is in the open position, fluid or gas 500 (represented by arrows) is free to enter the at least one inlet 210, travel through the flow path 400, and exit through the at least one outlet 220. The flow path 400 routes the fluid or gas 500 through the nozzle flow director 230 and back down across the tail 320 of the spool valve 300. The nozzle flow director 230 and the tail 320 significantly reduce the jet force created by the fluid or gas 500 to a level commensurate with the flow rate of the fluid or gas 500.

The routing and redirecting of the fluid or gas 500 flow from the at least one inlet 210, across the spool valve 300, back through an angled nozzle flow director 230, and across the tail 320 portion of the spool valve 300 to the at least one outlet 220 creates a condition whereby the spool valve 300 is pressure balanced and the jet forces are canceled or reduced to a level that a small solenoid-operated valve assembly 100 is sufficient for actuation. Moreover, the pressure tube 350 can be calibrated to protrude a given distance into the fluid or gas 500 to further alter the flow stream and to further nullify the effect of the jet forces. The pressure is also communicated to the opposite end of the spool valve 300 where it acts on the spool valve 300 area to induce a condition whereby the spool valve 300 is pressure balanced.

Having thus described in detail a preferred selection of embodiments of the present invention, it is to be appreciated and will be apparent to those skilled in the art that many physical changes could be made to the solenoid-operated valve assembly 100 without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A solenoid-operated valve assembly, comprising:
    a spool valve comprising:
        a fluid communication channel,
        a tail, and
        an inlet seat;
    a valve member housing comprising:
        at least one inlet,
        at least one nozzle flow director, and
        at least one outlet; and
    a flow path from the at least one inlet to the at least one outlet;
    wherein the spool valve is disposed in the valve member housing;
    wherein the flow path is at least partially defined by the at least one nozzle flow director;
    wherein the spool valve moves axially within the valve member housing between a closed position and an open position;
    wherein the inlet seat closes the flow path at the at least one inlet when the spool valve is in the closed position; and
    wherein the at least one nozzle flow director angles radially outward from the spool valve and directs a fluid to flow along a path into and through the tail, the at least one nozzle flow director is positioned between the inlet seat and the outlet, and the at least one nozzle flow director is configured to create a condition whereby the spool valve is pressure balanced and jet forces are reduced when the spool valve is not in the closed position.

2. The solenoid-operated valve assembly of claim 1, wherein the spool valve further comprises a pressure tube within the fluid communication channel.

3. The solenoid-operated valve assembly of claim 1, wherein a fluid flows into the at least one inlet, through the flow path, and out the at least one outlet when the spool valve is in the open position.

4. The solenoid-operated valve assembly of claim 1, wherein a gas flows into the at least one inlet, through the at least one flow path, and out the at least one outlet when the spool valve is in the open position.

5. The solenoid-operated valve assembly of claim 1, wherein the spool valve further includes a spring and the valve member housing further includes a solenoid coil.

6. The solenoid-operated valve assembly of claim 5, wherein power supplied to the solenoid coil moves the spool valve from the closed position to the open position.

7. The solenoid-operated valve assembly of claim 5, wherein power supplied to the solenoid coil moves the spool valve from the open position to the closed position.

8. The solenoid-operated valve assembly of claim 1, wherein the spool valve further comprises a hydraulic portion and a magnetic portion.

9. The solenoid-operated valve assembly of claim 8, wherein the hydraulic portion and the magnetic portion are one component.

10. A method of operation of a solenoid-operated valve assembly comprising:
    receiving fluid through an at least one inlet in a valve member housing;
    directing the fluid between the valve member housing and a spool valve, the valve member housing including at least one nozzle flow director, the spool valve including an inlet seat that stops the fluid from entering at the at least one inlet when the spool valve is in a closed position, the at least one nozzle flow director angles radially outward from the spool valve, is positioned between an inlet seat of the at least one inlet and the outlet, and is configured to create a condition whereby the spool valve is pressure balanced and jet forces are reduced;
    directing the fluid from the at least one nozzle flow director into and through a tail of the spool valve; and
    discharging the fluid axially from the tail of the spool valve.

11. The method of claim 10 further comprising receiving power to a solenoid coil wrapped around the valve member housing.

12. The method of claim 11 further comprising moving the spool valve to an open position when the solenoid coil receives power.

13. The method of claim 11 further comprising moving the spool valve to a closed position when the solenoid coil receives power.

14. A method of operation of a solenoid-operated valve assembly comprising:
    receiving gas through an at least one inlet in a valve member housing;
    directing the gas between the valve member housing and a spool valve, the valve member housing including at least one nozzle flow director, the spool valve including an inlet seat that stops the gas from entering at the at least one inlet when the spool valve is in a closed position, the at least one nozzle flow director angles radially outward from the spool valve, is positioned between an inlet seat and the outlet, and is configured to create a condition whereby the spool valve is pressure balanced and jet forces are reduced;

directing the gas from the at least one nozzle flow director into and through a tail of the spool valve; and discharging the gas axially from the tail of the spool valve.

15. The method of claim 14 further comprising receiving power to a solenoid coil wrapped around the valve member housing.

16. The method of claim 15 further comprising moving the spool valve to an open position when the solenoid coil receives power.

17. The method of claim 15 further comprising moving the spool valve to a closed position when the solenoid coil receives power.

* * * * *